Feb. 3, 1931. N. W. DALTON 1,791,054
METHOD OF DRYING AGRICULTURAL PRODUCTS
Original Filed March 10, 1927
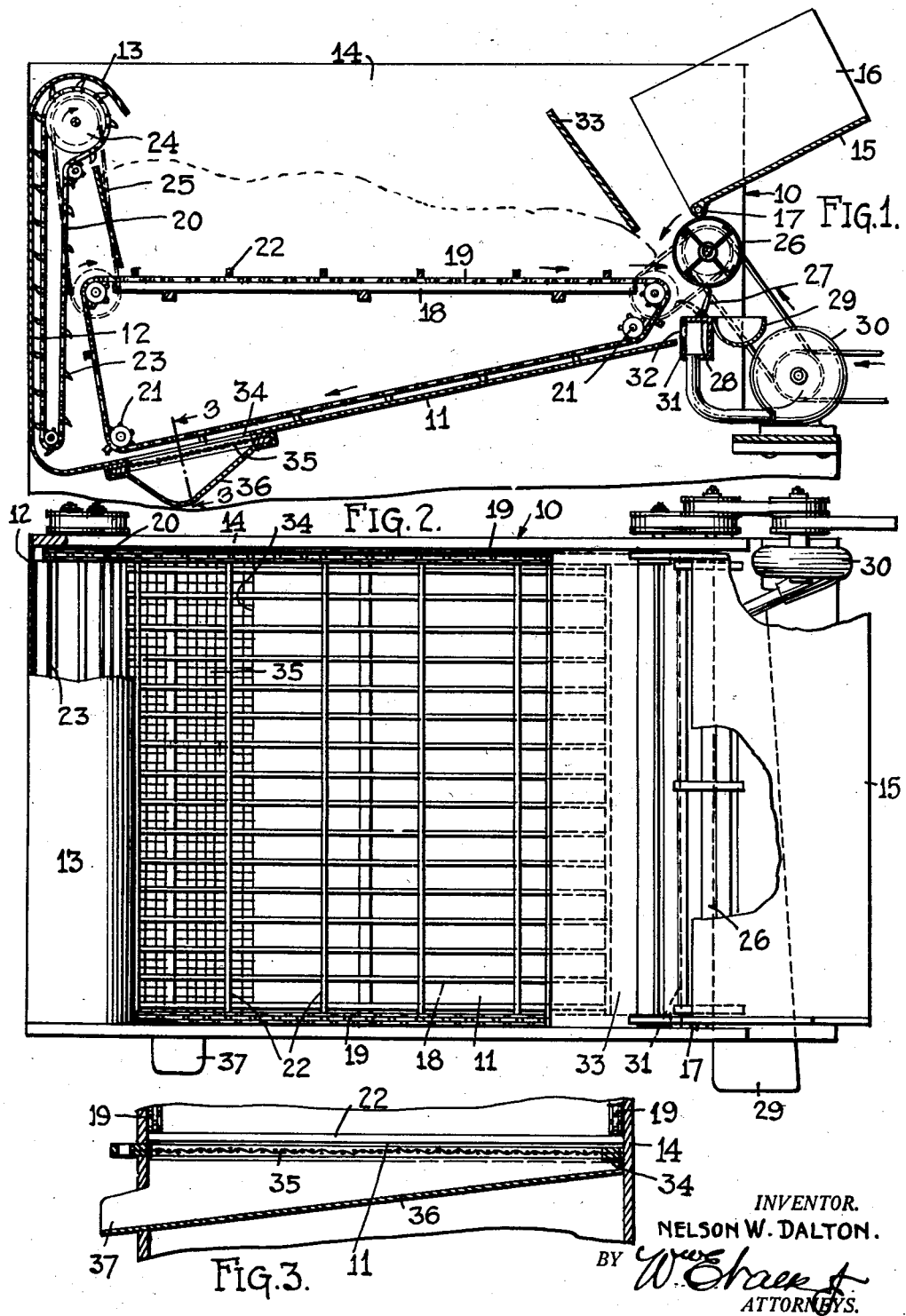
INVENTOR.
NELSON W. DALTON.

Patented Feb. 3, 1931

1,791,054

UNITED STATES PATENT OFFICE

NELSON W. DALTON, OF BATH, NEW YORK

METHOD OF DRYING AGRICULTURAL PRODUCTS

Original application filed March 10, 1927, Serial No. 174,193. Divided and this application filed October 10, 1928. Serial No. 311,472.

My invention relates to agricultural products and more particularly to a method of drying such agricultural products as hay, grass, sheaf grain, straw, alfalfa, bean pods, or the like.

In application Serial #174,193, filed March 10, 1927, of which this application is a division, one form of apparatus by means of which the invention is practised, is disclosed. Preferably such apparatus includes, among other instrumentalities, a container for the products to be dried, a conveyor operable within said container to move said products, during the drying thereof, toward a point of discharge, means operable to liberate within said container in the vicinity of said point of discharge a blast of air by means of which the discharged products are carried toward that end of the container remote from said point of discharge, and means operable within said container to deposit or re-deposit (as the case may be) upon said conveyor the products acted upon by said blast of air.

The method, as distinguished from said apparatus, embodies the following idea. The products to be dried are continuously moved in an endless path. During such movement, and preferably during each complete cycle thereof, the products to be dried are alternately subjected to the drying influence of an air blast directed thereon and to the drying influence of the escaping air after its force is substantially spent. As an aid in drying said porducts the invention contemplates also the mechanical agitation of said products during that period of the endless cycle characterized by the passage of the products from one to the other of the drying stages.

In the drawings, wherein that form of apparatus described in application Serial #174,193, is herein again illustrated:

Fig. 1 is a longitudinal sectional view of the drier;

Fig. 2 is a plan view (partly broken away), and

Fig. 3 is a section on the line 3—3 of Fig. 1.

The container designated in its entirety as 10, comprises an inclined bottom wall 11, an end wall 12 having its upper end portion 13 carried inwardly as shown, and side walls 14 between which the bottom wall 11 and the end wall 12 are disposed. Said container 10 is preferably open at one end (hereinafter referred to as the forward end) and at the top. At said open end, and between the side walls 14 of the container a feed platform 15, having side walls 16, is pivoted as at 17. This platform 15 is preferably so inclined as to feed by gravity the products into the container. Within the container, and likewise extending from one to the other of the side walls 14 thereof, a drying rack 18 is arranged. Preferably said rack is open throughout its entire length and extends substantially throughout the full length of the container.

The conveyor system by means of which the products to be or in the process of being dried are kept constantly in motion during a drying operation, comprises a horizontally extended endless conveyor 19 and a vertically extended endless conveyor 20. The sprockets 21, of which there are four, over which the conveyor 19 is carried, are so positioned within the container 10 as to lead said conveyor across the top wall of the drying rack 18 and along the bottom inclined wall 11 of the container. Like the drying rack 18 said conveyor is open throughout, except for cross-slats 22, spaced at intervals along its length. By extending the conveyor 19 along the top face of the drying rack 18, the products to be or in the process of being dried are carried slowly along said rack toward the forward end of the drier and by extending said conveyor along the bottom inclined wall 11 of the container, said bottom wall is scraped clean under all operating conditions. The endless conveyor 20 is mounted at the rear end of the container and is adapted to operate at a higher rate of speed than the conveyor 19. Its function is that of an elevator. Throughout its length it is provided with cross-members 23 which are adapted to pick up the products in circulation and deposit or re-deposit, as the case may be, such products onto that area of the conveyor 19 carried across and above the drying rack 18. The inturned portion 13 of the rear container wall beneath which the upper sprocket 24 of the conveyor 20 is located, serves as a guide by means of which the products lifted by said conveyor are directed onto the drying rack. To prevent said products from falling backwardly and against said conveyor 20 when discharged therefrom at the top thereof, a stripper rack 25 is provided.

At the forward end of the container 10, and likewise extended from one to the other of the side walls 14 thereof, I provide a beater 26. This beater 26 is rotatable in a counter-clockwise direction at the forward end of the conveyor 19 and directly beneath the feed platform 15. Its function is to disintegrate and loosen the products directed thereagainst by the movement of the conveyor 19 and by gravity from the feed platform 15, and by mounting said beater at the point indicated, the products acted upon are directed downwardly between said beater and said conveyor to a point from which said products may be either directed again into the drier or away from the drier according to whether or not said products have been completely dried and cured.

The means for guiding said products at the point of discharge consists of a suitable guide or baffle 27 pivoted as at 28 directly beneath the beater and at a point forwardly removed from the discharge terminous of the conveyor. In one position of adjustment, i. e., in that position illustrated in full lines in Fig. 1, said guide or baffle 27 directs the products acted upon in a downward direction and into the drier. In the dotted line position of said figure, said baffle 27 acts as a barrier preventing said products from entering within the drier. In said latter position the baffle 27 directs the products onto a discharge chute 29, extended across the forward end of the container. The drying action within the container 10 is produced by the introduction thereto of a strong blast of heated air. To this end a blower 30, suitably connected with a heater or furnace (not shown) is provided. From the blower 30 the air enters a wind box 31 extended from one to the other of the side walls of the container at or near the discharge end of the conveyor 19. Said wind box has formed therein, directly above the bottom inclined wall 11 of the container, an opening or slot 32 by means of which air is admitted to the container in a plane below the drying rack 18. The air thus admitted comes in contact with the products acted upon as said products are directed downwardly and into the drier by the baffle 27. As the volume of air at such point within the drier is more or less concentrated, the products, immediately after having been loosened by the beater 26, are carried rapidly along the inclined wall 11 toward the rear end wall 12 of the container. At this point the conveyor 20 picks up such products and deposits or re-deposits them upon the drying rack 18. The air upon entering the container 10, escapes therefrom in an upward direction and accordingly rises within the container thru the drying rack 18 and thru the products deposited thereon and moved across the path of air by the conveyor 19. It will be seen, therefore, that not only are the products subjected to the direct air blast but that they are subjected further to the drying influence of the rising or escaping air thus undergoing two distinct and wholly independent drying actions. To deflect the products in a downward direction as said products are carried forwardly along the drying rack 18, a terminal rack 33 is provided. This rack 33 functions also as a deflector by means of which the products fed into the drier from the feed platform 15 are forced against the beater 26.

As it is intended that the drier shall be used for drying bean pods and other agricultural products of a similar nature, I provide in the bottom wall of the container, and preferably at the rear end thereof, an opening 34. Such opening may or may not be provided with a screen 35 thru which the beans or other grain loosened by the beater 26 are free to fall. Beneath said screen, which is preferably removable for the substitution of a screen of different mesh, a hopper 36 is disposed. Within such hopper the beans or other grain are collected. If desired, a screw conveyor 37 may be mounted at one end of said hopper to carry off the grain directed thereinto.

In operation, the products to be dried are deposited onto the feed platform 15 which is adjustable. From said platform the products are fed against the beater 26. With the baffle 27 positioned as indicated by the full lines of Fig. 1, the products are carried into the drier and directly into the stream of escaping air. By the air rush, the products are picked up and carried along the bottom wall of the container toward its rear end. At this stage in the drying operation the products are subjected to the drying influence of the air as it issues from the wind box 31. From the rear end of the container the products are lifted by the conveyor 20 and deposited onto the drying rack 18 where they are again subjected to the drying influence of the air as it rises within the container and escapes thru the open top. The conveyor 19 in its travel carries the products, during the drying thereof, toward the forward end of the container. Should the products, at this stage, be not dried, said products may be recirculated thru the container and again subjected to the two distinct influences previously described. On the other hand, should said products be thoroughly dried or cured, such products can, by merely shifting the position of the baffle 27, be directed onto the discharge chute 19 where, by any suitable means such products may be carried away.

While I have described my invention in detail in its present preferred embodiment, it will be obvious to those skilled in the art after understanding my invention, that various changes and modifications may be made therein without departing from the spirit or scope thereof. I aim in the appended claims to cover all such modifications and changes.

What I claim is:

1. The method of drying agricultural products which consists in liberating within a container the products to be dried, in blowing said products toward one end of said container thru the introduction therein of a column of drying air, and in mechanically moving said products back again toward said point of liberation, said products while in motion thru said mechanical means being constantly subjected to the drying influence of the air as it rises within and escapes from said container.

2. The method of drying agricultural products which consists in moving in an endless path the products to be dried, in alternately subjecting said products, during each complete cycle, to the drying influence of an air blast directed thereon and to the drying influence of the escaping air after its force is substantially spent, and in mechanically agitating said products during that period of the endless cycle characterized by the passage of said products from one to the other of the drying stages.

3. The method of drying agricultural products which consists in moving in an endless path the products to be dried, in alternately subjecting said products, during each complete cycle, to the drying influence of an air blast directed thereon and to the drying influence of the escaping air after its force is substantially spent.

In testimony whereof I hereunto affix my signature.

NELSON W. DALTON.